United States Patent
Behl et al.

(10) Patent No.: US 11,575,499 B2
(45) Date of Patent: Feb. 7, 2023

(54) SELF AUDITING BLOCKCHAIN

(71) Applicant: International Business Machines Corporation, Armonk, NY (US)

(72) Inventors: Dushyant K. Behl, Bangalore (IN); Sayandeep Sen, Bangalore (IN); Palanivel Andiappan Kodeswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 17/109,465

(22) Filed: Dec. 2, 2020

(65) Prior Publication Data
US 2022/0173885 A1    Jun. 2, 2022

(51) Int. Cl.
*H04L 9/00* (2022.01)
*H04L 9/32* (2006.01)

(52) U.S. Cl.
CPC ............ *H04L 9/002* (2013.01); *H04L 9/3247* (2013.01); *H04L 9/50* (2022.05)

(58) Field of Classification Search
CPC .......... H04L 9/002; H04L 9/3247; H04L 9/50
See application file for complete search history.

(56) References Cited

U.S. PATENT DOCUMENTS

| | | | |
|---|---|---|---|
| 10,581,621 B2 | 3/2020 | Bathen | |
| 2016/0283920 A1 | 9/2016 | Fisher | |
| 2016/0328298 A1* | 11/2016 | Resch | G06F 3/06 |
| 2018/0219945 A1* | 8/2018 | Soni | H04L 67/1097 |
| 2019/0149321 A1 | 5/2019 | Androulaki | |
| 2019/0229892 A1* | 7/2019 | Jevans | H04L 9/3297 |
| 2019/0245697 A1 | 8/2019 | El Abed | |
| 2019/0303541 A1* | 10/2019 | Reddy | G06F 21/64 |
| 2019/0334912 A1* | 10/2019 | Sloane | H04L 9/0637 |
| 2020/0084189 A1 | 3/2020 | Russinovich | |
| 2020/0119904 A1* | 4/2020 | Philyaw | H04L 63/105 |
| 2020/0195437 A1* | 6/2020 | Gallagher | G06Q 30/08 |
| 2021/0073212 A1* | 3/2021 | Conley | G06Q 20/4014 |
| 2021/0303713 A1* | 9/2021 | Sreedhar | H04L 9/0861 |
| 2021/0314139 A1* | 10/2021 | Zhang | H04L 9/0825 |
| 2022/0114156 A1* | 4/2022 | Maher | H04L 9/50 |

FOREIGN PATENT DOCUMENTS

| | | |
|---|---|---|
| CN | 109359084 A | 2/2019 |
| CN | 109634810 A | 4/2019 |
| CN | 109684880 A | 4/2019 |

(Continued)

OTHER PUBLICATIONS

Li et al.; "Research on Distributed New Energy Information Interconnection Mode Based on Blockchain Consensus Mechanism", 2020, IEEE, pp. 436-441. (Year: 2020).*

(Continued)

*Primary Examiner* — Matthew Smithers
(74) *Attorney, Agent, or Firm* — Haley McClory

(57) ABSTRACT

A processor may collect process information associated with a peer node of a self-auditing blockchain. The processor may generate an imprint from the process information. The processor may compare the imprint from the peer node to an imprint consensus to detect an error. The error may indicate that the peer node has been compromised.

19 Claims, 9 Drawing Sheets

(56) References Cited

FOREIGN PATENT DOCUMENTS

| CN | 110135178 A | 8/2019 |
| CN | 111277553 A | 6/2020 |
| CN | 111464393 A | 7/2020 |
| WO | 202062131 A1 | 4/2020 |
| WO | 20220116761 A1 | 6/2022 |

OTHER PUBLICATIONS

Anonymous. "CrashRpt." Accessed May 27, 2020. 2 pages, <http://crashrpt.sourceforge.net/>.

Anonymous. "How Antivirus Works?" Accessed Nov. 23, 2020. 4 pages. Published by Comodo CyberSecurity. <https://antivirus.comodo.com/how-antivirus-software-works.php>.

Anonymous. "How Does an Antivirus Program Work to Protect Your Computer?" Accessed Nov. 23, 2020. 4 pages. Published by ComboFix. <https://combofix.org/how-does-an-antivirus-program-work.php>.

Anonymous. "Mozilla Crash Reporter." Accessed May 27, 2020. 4 pages. <https://support.mozilla.org/en-US/kb/mozillacrashreporter>.

Anonymous. "Real Time Scanning." Accessed Nov. 24, 2020. 3 pages. Published by Comodo. <https://help.comodo.com/topic-72-1-284-3011-.html>.

Collins, K., "One in 10 data breaches discovered in 2016 had gone undetected for more than a year." Published May 9, 2017. Accessed Nov. 23, 2020. 3 pages. Published by Quartz. <https://qz.com/978601/one-in-10-data-breaches-discovered-in-2016-had-gone-undetected-for-more-than-a-year/>.

Elliott, K., "WordPress Plugin Hack Went Undetected for 5 Years." Published Oct. 9, 2017. Accessed Nov. 23, 2020. 5 pages. Published by TechTalk. <https://techtalk.pcmatic.com/2017/10/09/wordpress-plugin-leaves-users-vulnerable/>.

Marks, P., "Why the Stuxnet worm is like nothing seen before." Published Sep. 27, 2010. Accessed Nov. 23, 2020. 8 pages. Published by NewScientist. <https://www.newscientist.com/article/dn19504-why-the-stuxnet-worm-is-like-nothing-seen-before/>.

Mell, et al., "The NIST Definition of Cloud Computing," Recommendations of the National Institute of Standards and Technology, U.S. Department of Commerce, Special Publication 800-145, Sep. 2011, 7 pgs.

Muresan, R., "How to detect targeted attacks by using memory introspection." Published May 24, 2016. Accessed Nov. 23, 2020. 8 pages. Published by Bitdefender. <https://businessinsights.bitdefender.com/detect-targeted-attacks-memory-introspection>.

International Searching Authority, "Notification of International Search Report and Written Opinion or Declaration", International Application No. PCT/CN2021/128076, dated Jan. 28, 2022, 9 pages.

* cited by examiner

SELF AUDITING BLOCKCHAIN

BACKGROUND

The present disclosure relates generally to the field of blockchain storage, and more particularly to identifying if a peer node within the blockchain has been affected by an attack.

Blockchain networks are often built on principles of trust. In order to maintain trust, data maintained by blockchain networks must be accurate. As such, identifying potential errors caused by malicious activity associated with the blockchain network, while ensuring trust is maintained, is paramount.

SUMMARY

Embodiments of the present disclosure include a method, system, and computer program product to self-audit a blockchain network. A processor may collect process information from a peer node in the self-auditing blockchain. The processor may generate an imprint from the process information of the peer node. The processor may compare the imprints of a peer node to a consensus imprint to detect one or more errors. The one or more errors may indicate a peer node has been compromised.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
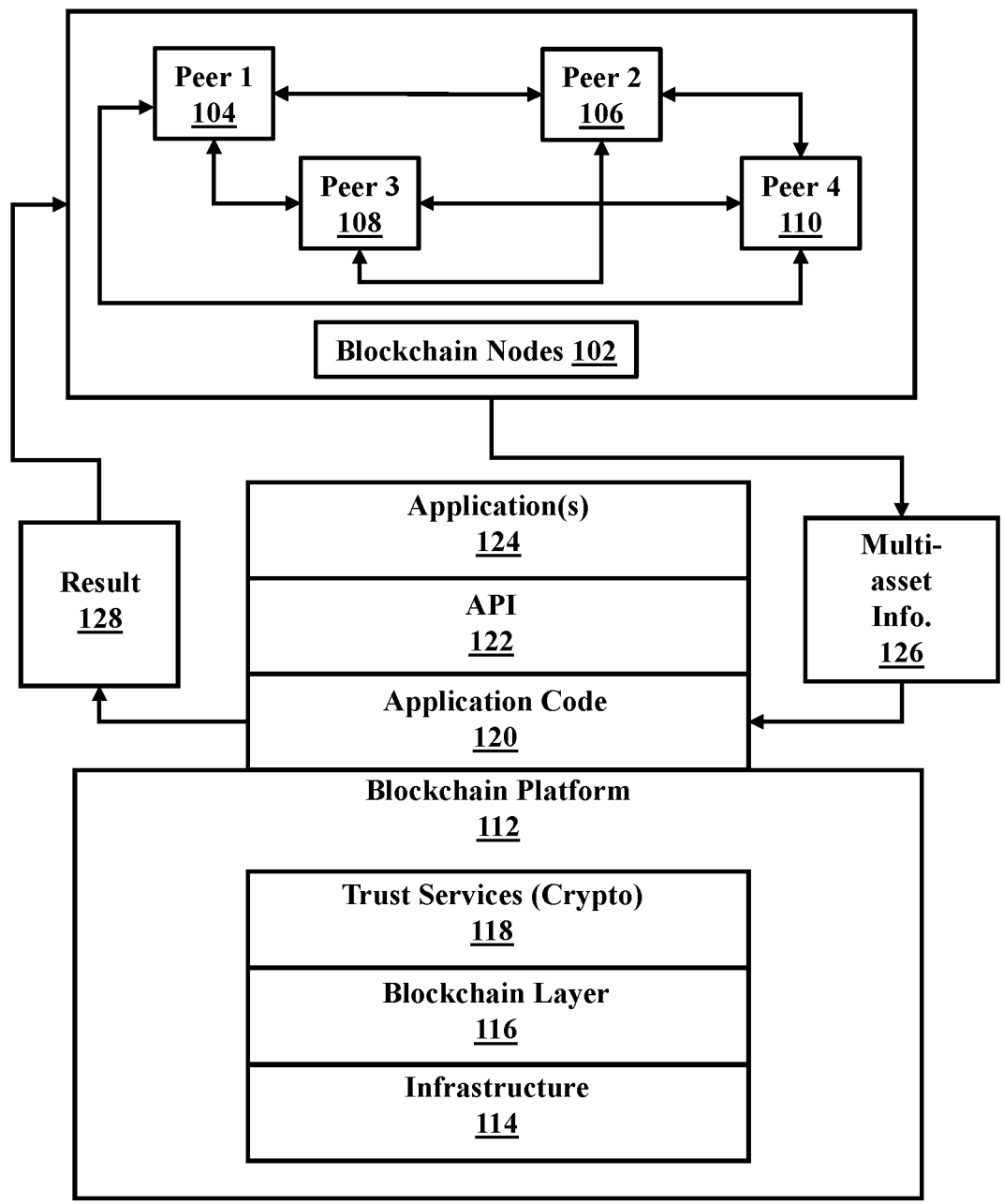
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the blockchain network security, and more specifically to configuring peer nodes within the blockchain network to perform self-auditing function, while maintaining peer trust. Private blockchain networks can share information that is highly sensitive. Often this sensitive information is required to be protected at any cost, but because of the nature of some blockchain networks (e.g., peer to peer based blockchain networks), this sensitive information can be exposed to attackers (e.g., hackers) who have malicious intent. Because of the nature of blockchain, security monitoring is generally out of the peer node's control. As blockchain becomes more well known, hackers are becoming more resilient at finding methods of compromising existing applications rather than using traditional hacking methods (e.g., injecting a virus onto a blockchain server). Such hacking activity is very hard to detect and can remain undetected for long periods of time.

Embodiments described herein address blockchain concerns associated with identifying if a peer node has compromised applications (e.g., hacks) and where those hacks originated. While attempts have been made identify hacks within peer nodes of the blockchain, such attempts often require access to the shared sensitive information maintained by the blockchain and reduce trust in the blockchain network.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that utilize self-auditing blockchain to identify if a peer node has been hacked and where in the application (e.g., process information) the hack or error occurred while maintaining trust in the blockchain network. Continuing trust in the blockchain network is possible because sensitive and secret information is able to remain confidential and no one party (e.g., organization or peer node) is responsible for determining if another peer node has been affected by a hack.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal, but which do not fully trust one another, such as businesses that exchange funds, goods, (private) information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed by the peers, which generate speculative transaction results. If enough peers to satisfy the endorsement policy produce identical execution results, the transaction is considered endorsed. After endorsement, the transactions enter an ordering phase in which a consensus protocol is used to produce an ordered sequence of endorsed transactions grouped into blocks. Traditionally used consensus protocols include first-in first-out (FIFO), and leader and follower protocols (e.g., Crash fault tolerance protocols).

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., orderer node).

Another type of node is a peer node which can receive ordered client submitted transactions (e.g., from ordering service), commit the transactions and maintain a state and a copy of the ledger of blockchain transactions. Peers can also have the role of an endorser, although it is not a requirement. An ordering-service-node or orderer is a node running an ordering service, which receives a stream of endorsed transactions from clients and emits a stream of ordered transactions. An ordering service node runs a communication service for all peer nodes, and implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for identifying discrepancies in a blockchain network. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that it improves the functionality of a computing system by implementing a method for processing a private transaction in a blockchain network. Through the blockchain system described herein, computing system (or a processor in the computing system) can perform functionality for the self-auditing blockchain network received from one or more client applications utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a network of users and on-board/off-board organizations to collaborate and execute service processes in the form of smart contracts (which may be associated with one or more assets).

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

A traditional database could not be used to implement the example embodiments because it does not bring all parties on the network, it does not create trusted collaboration, and does not provide for an efficient storage of digital assets. The traditional database does not provide for a tamper proof storage and does not provide for preservation of the digital assets being stored. As a result, the proposed embodiments described herein utilizing blockchain networks cannot be implemented in the traditional database.

If a traditional database were to be used to implement the example embodiments, the example embodiments would have suffered from unnecessary drawbacks such as search capability, lack of security and slow speed of transactions.

Accordingly, the example embodiments provide for a specific solution to a problem in the arts/field of auditing (e.g., self-auditing) of a blockchain network.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The code 120 may control blockchain assets. For example, the code 120 can store and transfer data, and may be executed by peers 104-110 in the form of a smart contract and associated chaincode with conditions or other code elements subject to its execution. As a non-limiting example, smart contracts may be created to execute the transfer of resources, the generation of resources, etc. The smart contracts can themselves be used to identify rules associated with authorization and access requirements and usage of the ledger. For example, the group transaction information 126 may be processed by one or more processing entities (e.g., virtual machines) included in the blockchain layer 116. The result 128 may include a plurality of linked shared documents (e.g., with each linked shared document recording the issuance of a smart contract in regard to the group transaction information 126, etc.). The physical infrastructure 114 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus confirming the group of transactions, identifying a conflict between one or more of the transactions in the group of transactions, etc.).

Figure 1B:
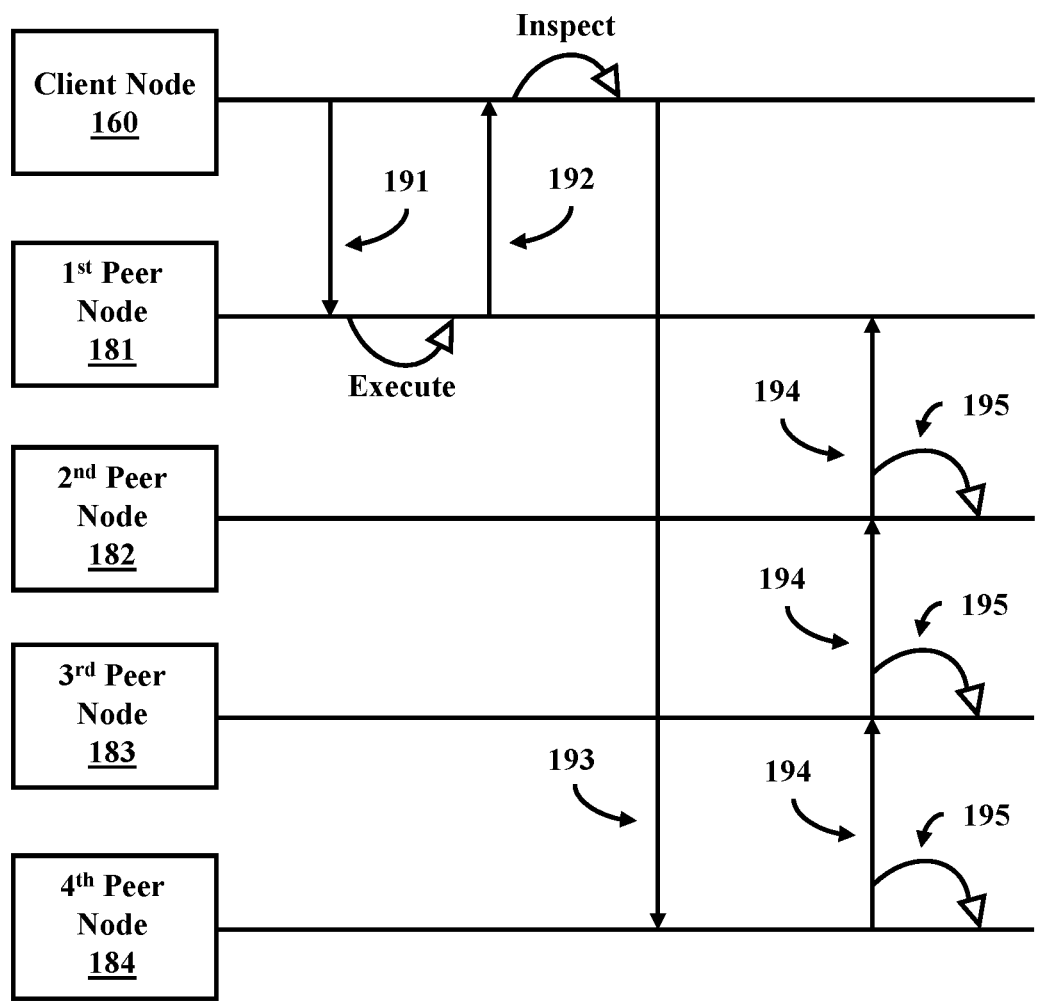
FIG. 1B illustrates a blockchain transactional flow, in accordance with embodiments of the present disclosure.

FIG. 1B illustrates an example of a conventional blockchain transactional flow 150 between nodes of the blockchain in accordance with an example embodiment. Referring to FIG. 1B, the transaction flow may include a transaction proposal 191 sent by an application client node 160 to one or more endorsing peer nodes 181 (e.g., in some embodiments, the transaction proposal 191 may be a transaction verification request and/or a conflict verification request). The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which is an endorser. The client 160 may include an application leveraging a supported software development kit (SDK), which utilizes an available API to generate a transaction proposal 191. The proposal is a request to invoke a chaincode function so that data can be read and/or written to the ledger (e.g., write new key value pairs for the assets). The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read-set, and write-set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers' signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting (e.g., has a transaction verification request been accepted). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 193 the client 160 assembles endorsements into a transaction and broadcasts the transaction proposal 191 and response within a transaction message to the ordering node 184. The transaction may contain the read/write sets, the endorsing peers' signatures and a channel ID. The ordering node 184 does not need to inspect the entire content of a transaction in order to perform its operation, instead the ordering node 184 may simply receive transactions from all channels in the network, order them by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated. Validated transaction and their associated values update the blockchain ledger, while invalidated transactions are committed but the invalidated transaction values do not update the blockchain ledger.

Figure 2A:
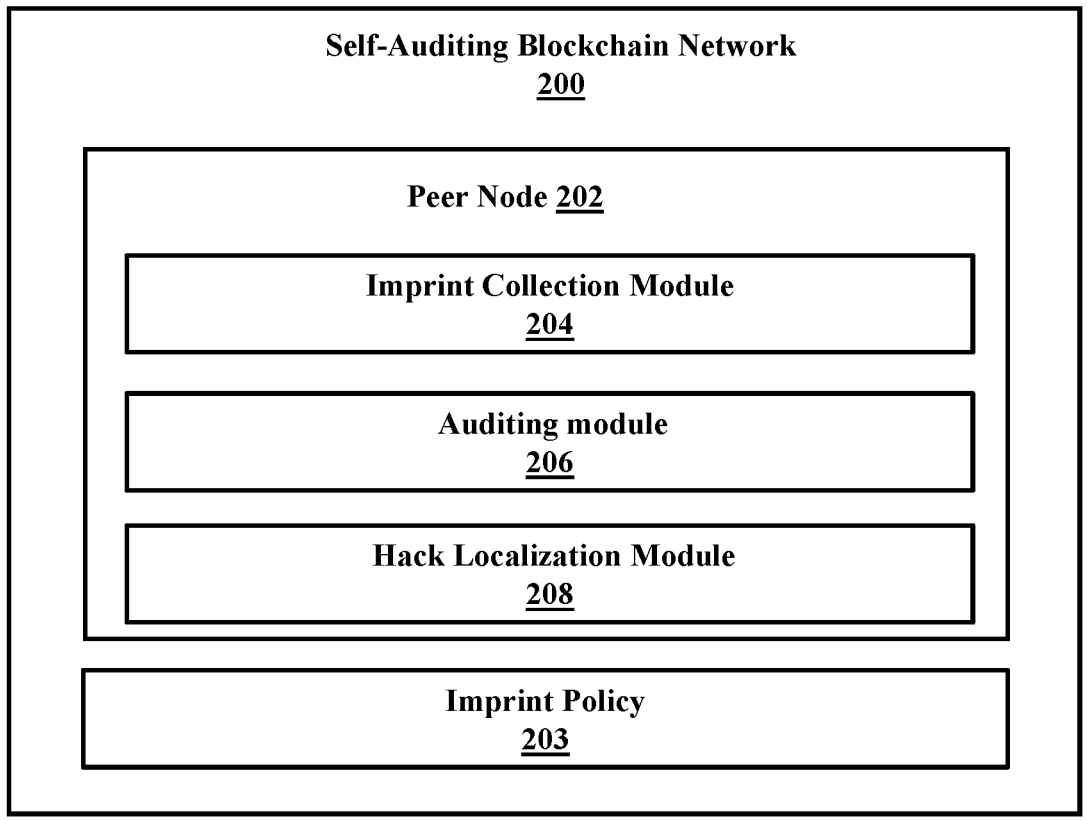
FIG. 2A depicts an example self-auditing blockchain network, in accordance with embodiments of the present disclosure.

Turning to FIG. 2A, illustrated is an example self-auditing blockchain network 200 for auditing and identifying potential malicious activity (e.g., worms and viruses) in a peer node 202, in accordance with embodiments of the present disclosure. Malicious activity, herein after referred to generally as errors and/or hacks, can take various malware forms including, but not limited to viruses, worms, a rogue software, or any combination thereof. While embodiments disclosed herein often refer to the self-auditing blockchain network 200 as a permissioned blockchain consortium (e.g., Hyperledger Fabric blockchain network), self-auditing blockchain network 200 can be configured to work within any type of blockchain consortium (e.g., permissionless blockchain) having peer nodes or nodes providing similar role functions. Self-auditing blockchain network 200 allows various peers within the blockchain consortium to determine if malware/error (e.g., hacks and/or nefarious/malicious activity) is affecting one or more of the peer nodes without jeopardizing trust within the blockchain consortium. Embodiments discussed herein allow for real-time malicious activity detection and methods associated with localizing where the malicious activity has affected the integrity of the blockchain consortium.

In embodiments, self-auditing blockchain network 200 can include peer node 202 and imprint policy 203. Peer node 202 can be configured to include imprint collection module 204, auditing module 206, and hack localization module 208. While in some embodiments (e.g., as shown in FIG. 2A) auditing module 206, hack localization module 208 are separately configured from imprint collection module 204, in other embodiments, auditing module 206 and hack localization module 208 are subcomponents of imprint collection module 204. Various embodiments will be discussed herein regarding each module (e.g., imprint collection module 204, auditing module 206, and hack localization module 208). In general, each participating peer node (e.g., peer node 202) includes: i) imprint collection module 204 configured to generate an imprint (e.g., imprint 220) specific to the peer node the particular module is housed and collect the imprints generated by other participating peer nodes; ii) auditing module 206 configured to identify a consensus among the collected imprints and compare each imprint to the consensus imprint; iii) hack localization module 208 configured to receive imprints from auditing module 206 that do not match the consensus imprint and identify where in the peer node's process information the hack occurred.

While embodiments disclosed herein often refer to a single peer node (e.g., peer node 202), self-auditing blockchain network 200 can include any number of similarly configured peer nodes. These embodiments generally depict the self-auditing blockchain network 200 at the peer node level and should not be construed as a blockchain consortium having only one peer node. In embodiments, self-auditing blockchain network 200 and the herein disclosed embodiments can be applied to each peer node (e.g., peer node 202) within the blockchain consortium. In these embodiments, each peer node is similarly configured (e.g., as disclosed in references to peer node 202) in order to perform consistent and effective self-auditing for the entire blockchain. As referenced herein, self-auditing blockchain network 200 can be configured within a permissioned blockchain consortium. Permissioned blockchains can be configured to have multiple organizations that can each have one or more peer nodes in their respective datacenters.

In some embodiments, self-auditing blockchain network 200 can include imprint policy 203. In embodiments having imprint policy 203, imprint policy 203 can include standards and conditions each peer node 202 comprising self-auditing blockchain network 200 must abide by and implement when performing self-auditing functions (e.g., such as imprint generation). While imprint policy 203 will be discussed in greater detail herein, imprint policy 203 provides conditions each peer node 202 must follow to ensure the results of self-auditing functions are repeatable and consistently applied among all of the peer nodes 202 in the blockchain network. For example, imprint policy 203 can provide conditions and rules that must be followed in order for each peer node 202 to generate an imprint (e.g., what data/information constitutes process information 212, discussed in reference to FIG. 2B), identify how a consensus imprint is determined, and how peer node 202 and/or self-auditing blockchain network 200 reacts when one or more errors (e.g., hacks) are identified in peer node 202's imprint.

In embodiments, peer node 202 can include imprint collection module 204. Imprint collection module 204 can be located within peer node 202's operating system kernel. In these embodiments, where imprint collection module 204 is implemented within peer node 202's operating system kernel, ensues that imprint collection module 204 is protected and is prevented from being accessed by application programs or other less critical components of peer node 202's operating system which could become affected by malware/errors (e.g., hacks). In embodiments, imprint collection module 204 can collect process information from peer node 202.

While in some of these embodiments, the process information may be stored in one or more process address spaces within the operating system kernel address space, in other embodiments, process information can be stored in one or more process address spaces outside peer node 202's operating system kernel. In embodiments where the process information is stored in one or more process address spaces outside of the operating system kernel, imprint collection module can be configured to collect the process information from the relevant process address spaces. Peer node 202 can also employ any type of computer security technique, such as address space layout randomization (ASLR), to reduce or eliminate memory corruption vulnerabilities. Using such computer security techniques ensures that attackers are unable to cloak or hide their malicious activity while the self-auditing blockchain network 200 performs auditing functions.

An attacker refers to those actors perpetuating hacks and malware upon self-auditing blockchain network 200. While an attacker can be associated with parties outside the blockchain consortium, such actors or activity can sometimes arise from malicious peer nodes within the self-auditing blockchain network 200. Attackers often aim to subvert various aspects of the blockchain by keeping their malicious activity secret. In general, the longer the malicious activity occurs in secret, the more chance the attacker will succeed in their desired goal. In embodiments, ASLR, or other similar computer security techniques, can randomly arrange the address spaces associated with process information 212 (e.g., including executable code, stack, HEAP and/or libraries), and make it more difficult for an attacker to predict particular address spaces. For example, if an attacker, such as a malicious peer node 202 out of a group of peer nodes 202 could predict the address spaces of the process information 212 associated with peer node 202, an attacker (e.g., malicious peer node 202) could identify what process information 212 is representative of non-hacked processes (e.g., process information not effected by errors/hacks or malicious activity) and produce a counterfeit imprint that mimics imprints (e.g., 220) that do not indicate a hack has occurred. As such, by making address spaces harder to predict self-auditing blockchain network 200 can perform self-auditing functions and ensure each participating peer node 202 trusts the results associated with the self-audit. In embodiments, imprint collection module 204 can be made aware of ASLR ASLR positioning by hooking into the runtime loader associated with peer node 202.

Figure 2B:
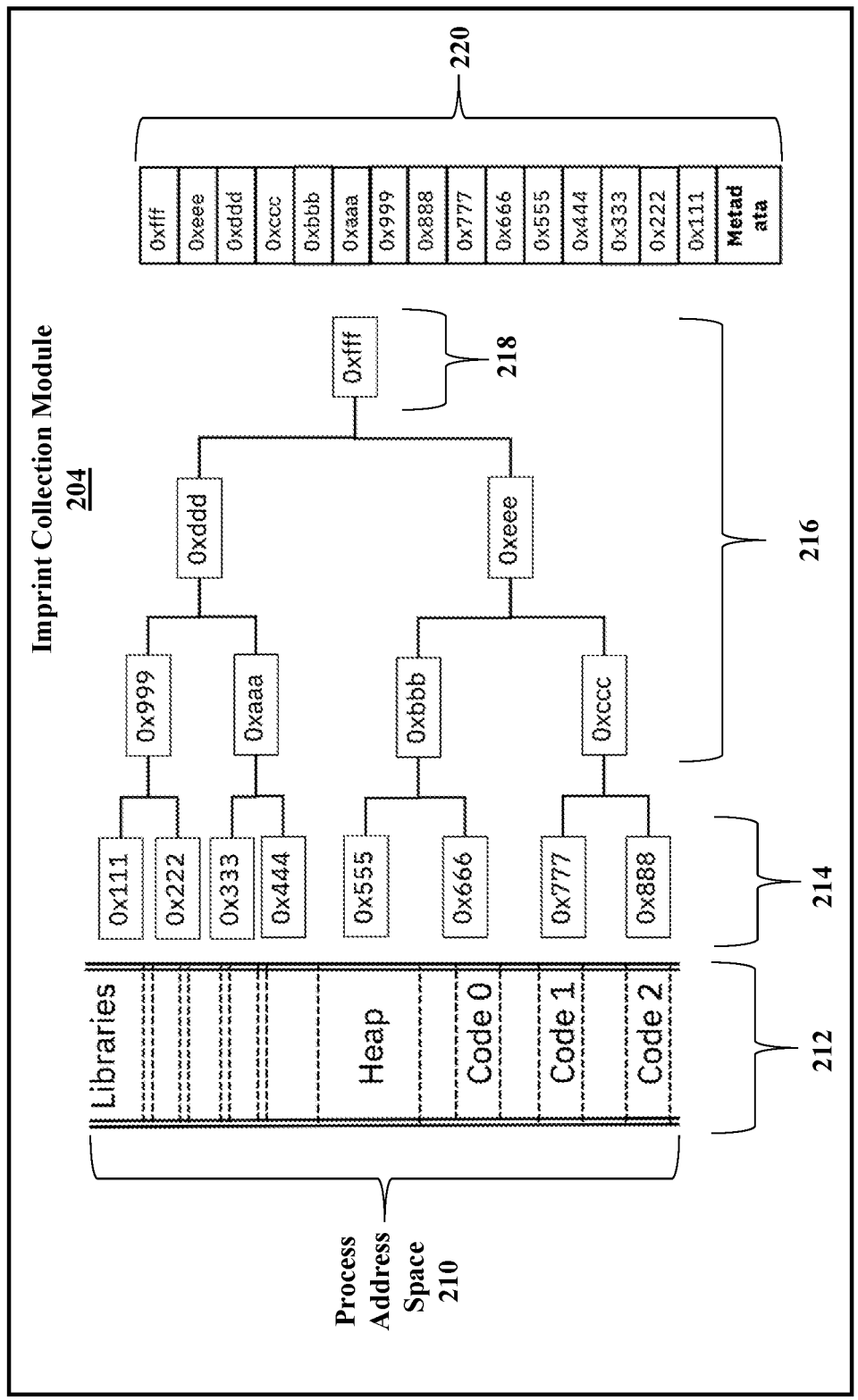
FIG. 2B illustrates a block diagram depicting an embodiment of imprint generation, in accordance with embodiments of the present disclosure.

In embodiments, peer node 202 can use the collected process information, imprint collection module 204 to generate an imprint (e.g., imprint 220 as shown in FIG. 2B) that is representative of the different process information (e.g., process information 212 as shown in FIG. 2B) collected by imprint collection module 204. An imprint can be representative of process information collected during the life of peer node 202 or, alternatively, can be representative of the process information collected during a particular period. In embodiments, imprint policy 203 can dictate how often the process information is collected by each peer node 202. For example, imprint policy 203 can provide the condition that process information is collected after a particular duration of time or after peer node 202 has accumulated a particular number of process information entries (e.g., an imprint is generated after 10 or 100 different process information entries). While an imprint can be generated in various ways, some example embodiments of imprint generation are discussed in reference to FIG. 2B.

FIG. 2B provides example embodiments depicting how imprint collection module 204 may generate an imprint (e.g., imprint 220), in accordance with embodiments of the present disclosure. As Shown in FIG. 2B, imprint collection module 204 can collect process information 212 from process address space 210. Process address space(s) 210 can represent address spaces and process information (e.g., process information 212) collected from inside peer node 202's operating system kernel, outside peer node 202's operating system kernel, or any combination thereof. While process information 212 can generally refer to information and data generated as a result of peer node 202 performing routine blockchain functions and can include any type of data/information (e.g., as conditioned by imprint policy 203). While process information 212 can include any type of data/information, often this data/information is of a type that would be affected if a hack (e.g., error) had occurred. In embodiments, imprint 220 can be generated using any type of process information 212, as contemplated herein, or generated from fewer than all of the available types of process information 212. For example, while in some embodiments process information 212 can include types of process information such as code, libraries, transactional metadata, and data saved to other memory storage areas within peer node 202's operating system (e.g., HEAP), in other embodiments, imprint collection module 204 can generate imprint 220 using only one type of process information 212, such as a particular type of code (e.g., executable code segments). In some embodiments, code can refer to and include both executable code segments (e.g., Code 0, Code 1, Code 2) and data code segments, or in other embodiments, the collected process information 212 can be include to either executable code segments or data code segments. In embodiments, imprint policy 203 can provider peer node 202 with conditions on what data/information should be considered process information 212 and what data/information should be disregarded when generating an imprint. Without this consistency, each peer node 202 within self-auditing blockchain network 200 would rely on its own definition of process information 212, independent of other peers, and would likely incorporate different data/information into imprint 220. Continuing this example, if each peer node generates an imprint using different data/information, then it is likely each peer node would produce a different imprint. If each imprint generated by a peer node 202 is different, then no consensus can be identified among the generated imprints, and the self-auditing function cannot be performed.

In embodiments, imprint collection module 204 can generate imprint 220 using one or more hashing iterations. While known by those skilled in the art, hashing can generally refer to applying a hash function to a string of characters (e.g., process information 212) and transforming the string of characters into a shorter or fixed length value that is representative of the original character string. Using the example depicted in FIG. 2B, if Code 0 and Code 1 in process address space 210 contained exactly the same string of characters and both Code 0 and Code 1 were hashed by the same hash function, each resulting hash process information 214 would be identical. However, in this same instance, if Code 0 and Code 1 were to vary from each other by one or more characters, the two resulting hash process information 214 would be different. Imprint collection module 204 can be configured to use any available hash function or combination of hash functions.

In FIG. 2B, imprint collection module 204 can be configured to generate Merkle tree 216 and Merkle root 218 by hashing process information 214 pages chunk by chunk. While the resulting imprint 220 generated by imprint collection module 204 can range in complexity, imprint 220 should be representative of all of the collected process information 212. As such, in some embodiments imprint 220 can simply be Merkel root 218. In other embodiments, imprint 220 can include list of each hashed page comprising the generated Merkel tree 216, or a subset of the generated Merkel tree 216, ordered in a particular sequence. Imprint 220, as shown in FIG. 2B depicts an imprint that is ordered in a particular sequence. For example, as shown in FIG. 2B, imprint 220 can include a combination of components ordered in a particular sequence. Imprint 220 can begin with Merkle root 218 and be followed by individual generational hashed page chunks.

In some embodiments, each imprint 220 can end with one or more pieces of metadata. This metadata can include data/information associated with imprint generation and/or process information 212. In these embodiments, this metadata can include information regarding how the initial imprint was generated. For example, this metadata can include a time stamp of when imprint 220 was generated, a counter to differentiate between different imprints generated by the same peer node, information associated with how the different pages of process information 212 are arranged, and how many different pieces of process information 212 were initially collected by peer node 202 before imprint 220 was generated. In some embodiments, this metadata can be used by auditing module 206 and hack localization module 208 to identify and locate where the hack/error occurred. In embodiments, imprint policy 203 can provide each peer node 202 with conditions associated with what hash function (s) should be used to generate imprint 220, what hashed components should be used in imprint 220 (e.g., Merkle root 218 and/or Merkle tree 216), if there are more than one hashed component, how each component should be sequenced, or any combination thereof.

In embodiments, imprint collection module 204 and auditing module 206 can be configured to work together to perform auditing functions. In embodiments, imprint collection module 204 can ensure the generated imprint 220 is safe against an attacker by using various modes of encryption. For example, imprint collection module 204 can use a random symmetric key to encrypt imprint 220. By encrypting imprint 220, imprint collection module 204 can reduce or prevents attackers from observing an imprint of a healthy peer node (e.g., a peer node that has not been hacked) and allowing the attackers to cloak their activates by producing an imprint that is a reproduction of the healthy peer node's imprint. In embodiments, imprint collection module 204 can be configured to generate a first message. In these embodiments, imprint collection module 204 can configure the first message to include the encrypted imprint and a signature that identifies which peer node 202, among all the peer nodes within the blockchain network, produced the imprint (e.g., imprint 220). Once generated, imprint collection module 204 can commit the first message to the blockchain.

As discussed herein, while embodiments are often herein viewed from the peer node level (e.g., peer node 202), each peer node within the blockchain network (e.g., self-auditing blockchain network 200) performs similar actions. As such, each peer node commits a first message to the blockchain that includes at least an encrypted imprint that is representative of their respective process information (e.g., process information 212) and a signature particular to the peer node that can be used for identification. By having each peer node 202 commit their respective first messages to the blockchain allows self-auditing blockchain network 200 to maintain a log of imprints that are attacker resistant, and that can be used for later use.

After each first message from each peer node within self-auditing blockchain network 200 is committed to the blockchain, imprint collection module 204 of each peer node 202 produces a second message. In embodiments, the second message can include the signature of the particular peer node and the encryption key (e.g., the random symmetric key) used to encrypt the imprint (e.g., imprint 220) in the first message. In embodiments, each peer node 202 then commits this second message to the blockchain. This configuration of first committing the first message to the blockchain ensures that there is a record of imprints that cannot be altered and can only be deciphered after each peer node's second message is committed. Such a configuration ensures that peer nodes and/or attackers cannot alter their original imprints to cloak their hacks/errors or malicious activity from the self-auditing blockchain network 200.

In embodiments, while each peer node 202 is configured to have auditing module 206, often only one peer node need be accessed in order to perform auditing functions. In embodiments, auditing module 206 can be configured to collect the encrypted imprints from the first message associated with every peer node (e.g., peer node 202) in self-auditing blockchain network 200. In some embodiments, auditing module 206 can be configured to verify that each imprint was generated by a trusted peer node. In these embodiments, auditing module 206 can verify the peers identifying signature. While in some embodiments, if auditing module 206 is unverified the verification request is resubmitted, in other embodiments, auditing module 206 can be configured to raise an alarm dictating to the rest of the self-auditing blockchain network 200 that a peer node has been participating in the blockchain network without permission. Once each peer node in self-auditing blockchain network 200 has been verified, auditing module 206 can be configured to collect each random symmetric key from either each individual peer node's imprint collection module 204 used to encrypt each imprint, or can collect each random symmetric key from the second messages. In embodiments, when auditing module 206 has decrypted each imprint (e.g., from the set of first messages) using the collected keys, auditing module 206 can analyze each peer node 202's generated imprint. In these embodiments, auditing module 206 can analyze each imprint and associated metadata to identify within the collection of imprints if there is a consensus imprint. A consensus imprint can be identified when a population of imprints have the exact same imprint. In embodiments, imprint policy 203 can further include what qualifies as a consensus imprint. For example, imprint policy 203 can identify a consensus imprint as either being a simple majority or a super majority of identical imprints generated from the various peers. In embodiments, if auditing module 206 determines one or more imprints does not match the consensus imprint, those imprints are submitted to the hack localization module 208.

Figure 2C:
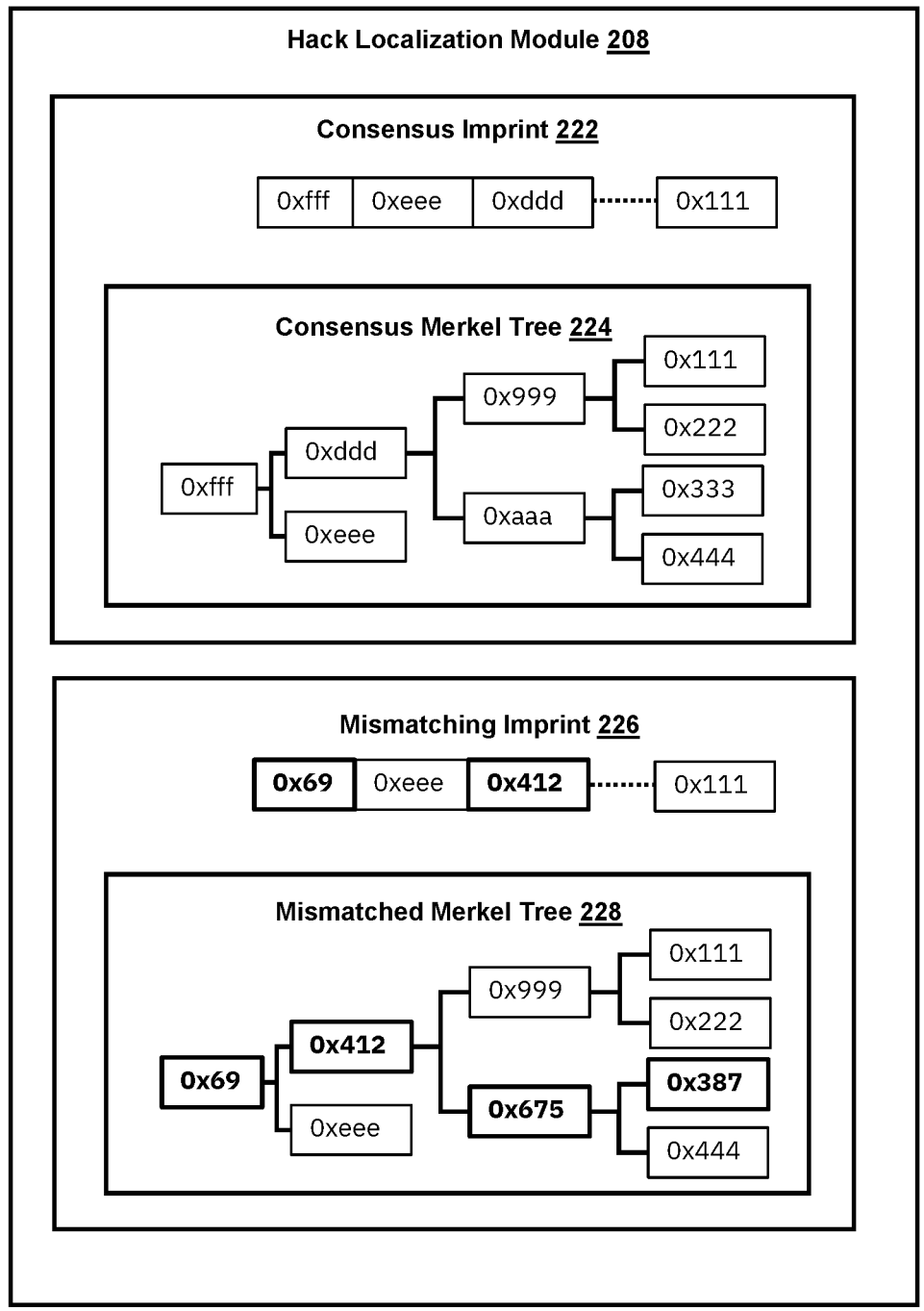
FIG. 2C illustrates a block diagram depicting an embodiment of hack localization, in accordance with embodiments of the present disclosure.

Turning to FIG. 2C, an example of hack localization module 208 is depicted, in accordance with embodiments of the present disclosure. In embodiments, hack localization module 208 can be configured to compare the consensus imprint 222 to the identified mismatching imprint 226. In these embodiments, hack localization module 208 can expand both consensus imprint 222 and mismatching imprint 226 and reconfigure the respective Merkel trees associated with each imprint (e.g., consensus Merkel tree 224 and mismatched Merkel tree 228). In embodiments, hack localization module 208 can compare consensus Merkel tree 224 and mismatched Merkel tree 228 and identify which hashes (e.g., leaves/branches of the Merkel tree) are different. If a hash in mismatched Merkel tree 228 is the same as a hash in consensus Merkel tree 224 then there is not an indication that a hack/error has occurred. However, if a hash of the mismatched Merkel tree 228 is different from a corresponding hash of the consensus Merkel tree 224 this indicates that there is a difference in what processes were performed on that particular peer node. In embodiments, when a hack/error has been identified and localized, a report can be generated that identifies the hack/error and where the hack occurred. While in some embodiments, this report can be sent to only the peer node that has been identified to have the hack, in other embodiments, the report can be sent to one or more other peer nodes in the self-auditing blockchain network (e.g., those reports identifying many hacks/errors within a single peer node's process information).

Figure 3:
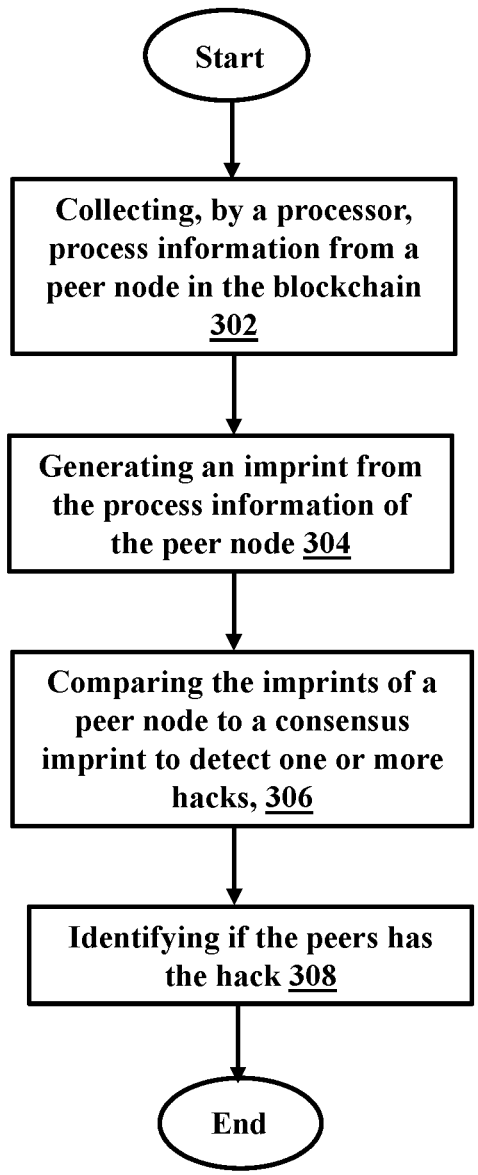
FIG. 3 illustrates a flowchart of an example method for configuring a self-auditing blockchain, in accordance with embodiments of the present disclosure.

Referring now to FIG. 3, a flowchart illustrating an example method 300 for self-auditing a blockchain network, in accordance with embodiments of the present disclosure. In some embodiments, the method 300 may be performed by one or more peer nodes within the blockchain network (e.g., blockchain network 200).

In some embodiments, the method 300 begins at operation 302 where the processor collects process information from a peer node in the blockchain network. The method 300 proceeds to operation 304 where the processor generates an imprint form the process information of the peer node. The method 300 proceeds to operation 306 where the processor compares the imprint of the peer node to a consensus imprint to detect one or more hacks/errors. The method 300 proceeds to operation 308 where the processor identifies, if the peer node has been hacked.

In some embodiments, as depicted, after operation 308, the method 300 may end.

In some embodiments, discussed below, there are one or more operations of the method 300 not depicted for the sake of brevity with operations/steps further performed by the processor. Accordingly, in some embodiments, the processor may identify where the error of the compromised peer occurs in the process information using the imprint. In some embodiments, generating the imprint form the process information may comprise the processor hashing he process information from the peer node to generate a Merkle tree. The processor may generate the Merkle tree. The processor may configure the Merkle tree to form the imprint of the peer node.

In some embodiments, the processor may encrypt the imprinted to form an encrypted imprint. The processor may generate a first message. The first message may include the encrypted imprint and a signature. The signature may identify the peer node associated with the imprint. The processor may commit the first message to the blockchain.

In some embodiments, the processor may generate a second message. The second message may include one or more keys to decrypt the encrypted imprint to reform the imprint. The processor may commit the second message to the blockchain.

In some embodiments, the processor may verify the signature of the peer node associated with the first message. The processor may collect the one or more keys from the second message. The processor may decrypt the encrypted imprints of the first message with the one or more keys form the second message.

In some embodiments, comparing the imprint to the imprint consensus to detect the error may comprise the process determining the imprint consensus. Determining the imprint consensus may include identifying a group of peer nodes having an identical imprint.

In some embodiments, the processor may analyze the imprint consensus. The processor may identify the process information associated with the imprint that does not identically match the imprint consensus. The processor may generate a report. The report may include where the error is located within the process information.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
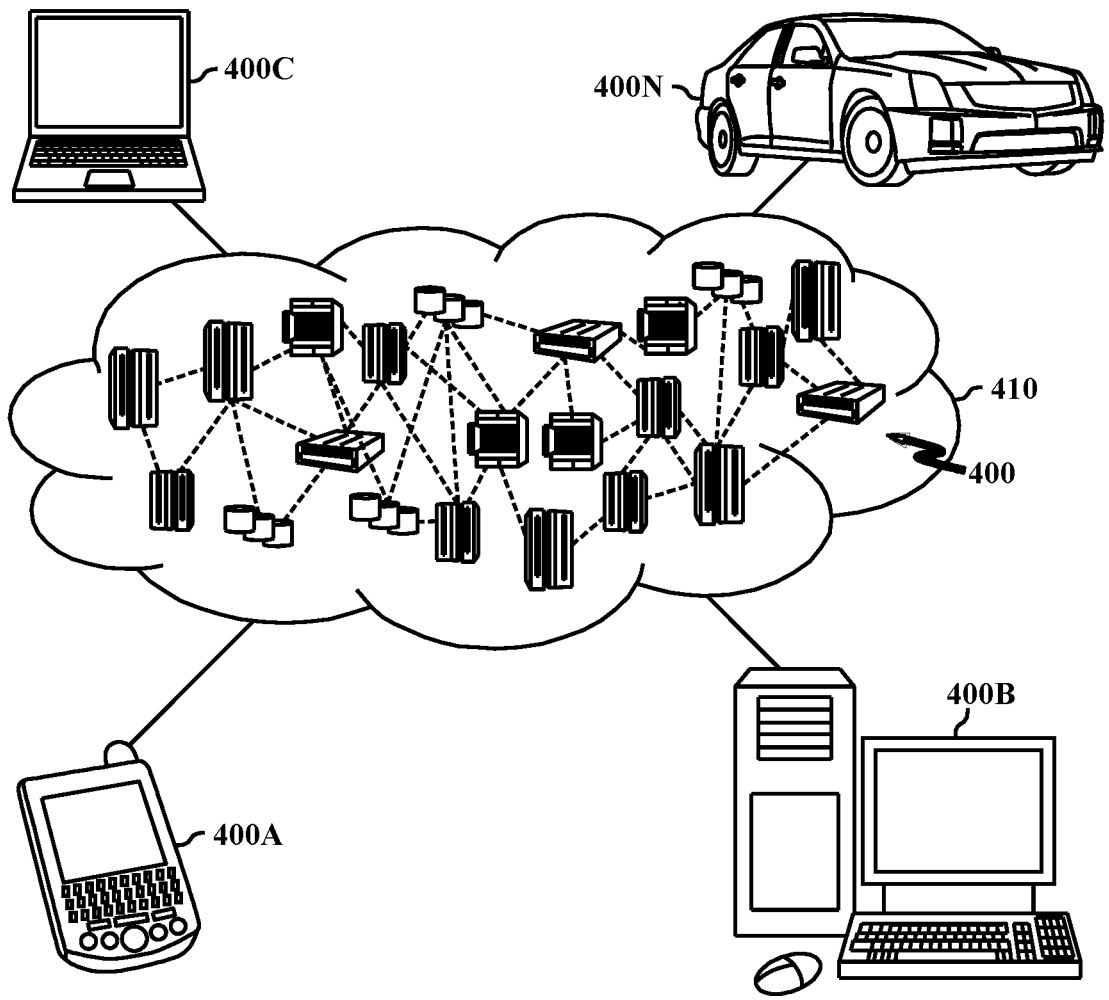
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
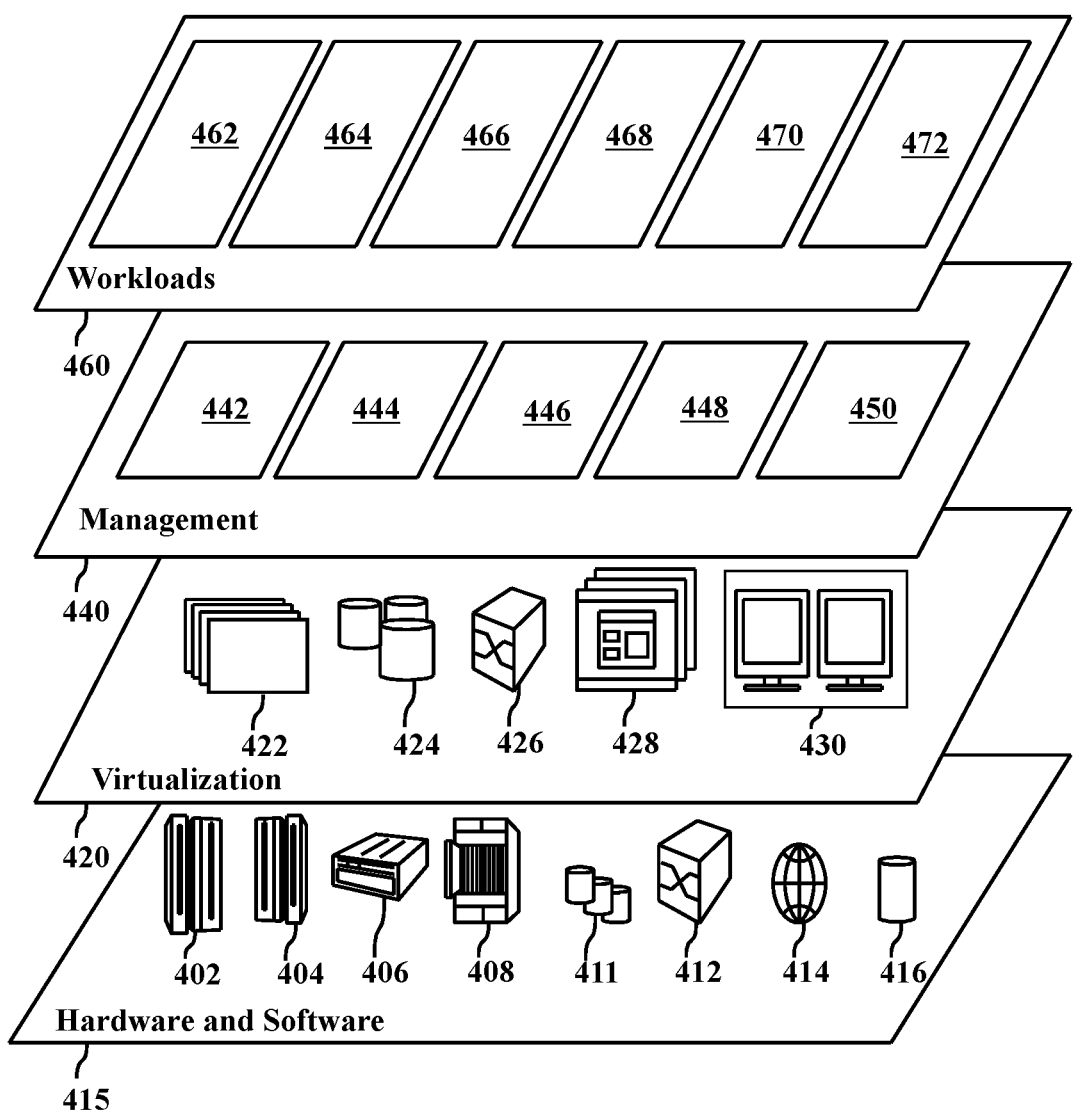
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and self-auditing 472.

Figure 5:
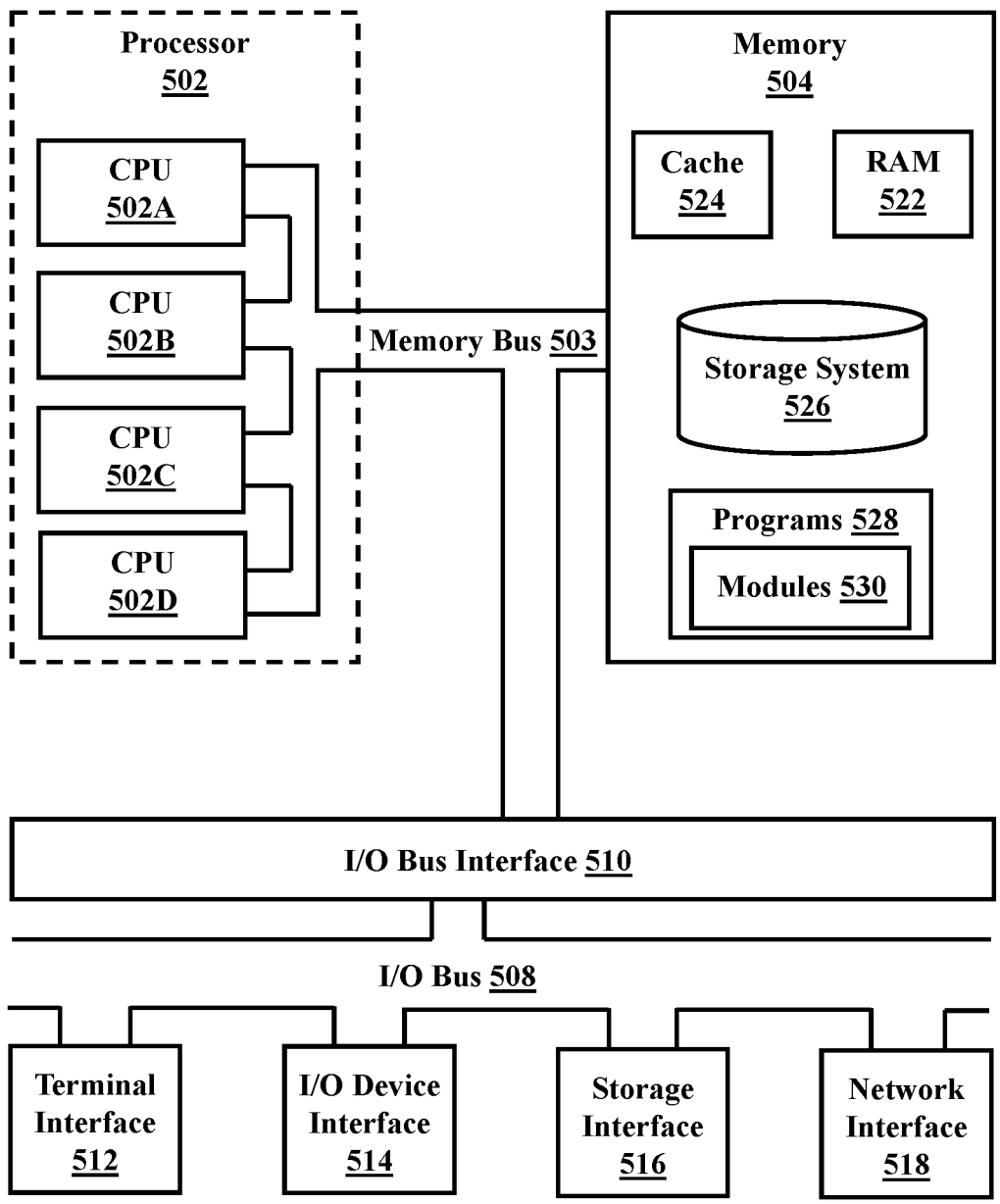
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for a self-auditing blockchain having one or more peer nodes, the method comprising:
   collecting, by a processor, process information associated with each peer node of the one or more peer nodes associated with the self-auditing blockchain;
   generating an imprint for each peer node of the one or more peer nodes from the process information using one or more hash functions;
   determining an imprint consensus, wherein determining the imprint consensus includes identifying a group of peer nodes, of the one or more peer nodes, having an identical imprint; and
   comparing the imprint from each of the one or more peer nodes to the imprint consensus to detect an error, wherein the error indicates that a peer node of the one or more peer nodes has been compromised.

2. The method of claim 1, further comprising:
   identifying where the error of the compromised peer occurs in the process information using the imprint.

3. The method of claim 1, wherein generating the imprint from the process information further comprises:
   hashing the process information from each of the one or more peer nodes to generate a Merkle tree;
   generating the Merkle tree; and
   configuring the Merkle tree to form the imprint of each of the one or more peer nodes.

4. The method of claim 1, further comprising
   encrypting the imprint to form an encrypted imprint;
   generating a first message, wherein the first message includes the encrypted imprint and a signature, wherein the signature identifies a peer node of the one or more peer nodes associated with the imprint; and
   committing the first message to the blockchain.

5. The method of claim 4, further comprising:
   generating a second message, wherein the second message includes one or more keys to decrypt the encrypted imprint to reform the imprint; and
   committing the second message to the blockchain.

6. The method of claim 5, further comprising:
   verifying the signature of a peer node of the one or more peer nodes associated with the first message;
   collecting the one or more keys from the second message; and
   decrypting the encrypted imprints of the first message with the one or more keys from the second message.

7. The method of claim 1, further comprising:
   analyzing the imprint consensus;
   identifying the process information associated with the imprint that does not identically match the imprint consensus; and
   generating a report, wherein the report includes where the error is located within the process information.

8. A system for a self-auditing blockchain having one or more peer nodes, the system comprising:
   a memory; and
   a processor in communication with the memory, the processor being configured to perform operations comprising:
      collecting process information associated with each peer node of the one or more peer nodes associated with the self-auditing blockchain;
      generating an imprint for each peer node of the one or more peer nodes from the process information using one or more hash functions;
      determining an imprint consensus, wherein determining the imprint consensus includes identifying a group of peer nodes, of the one or more peer nodes, having an identical imprint; and
      comparing the imprint from each of the one or more peer nodes to the imprint consensus to detect an error, wherein the error indicates that a peer node of the one or more peer nodes has been compromised.

9. The system of claim 8, the processor being further configured to perform operations comprising:

identifying where the error of the compromised peer occurs in the process information using the imprint.

10. The system of claim 8, wherein generating the imprint from the process information further comprises:
hashing the process information from each of the one or more peer nodes to generate a Merkle tree;
generating the Merkle tree; and
configuring the Merkle tree to form the imprint of each of the one or more peer nodes.

11. The system of claim 8, the processor being further configured to perform operations comprising:
encrypting the imprint to form an encrypted imprint;
generating a first message, wherein the first message includes the encrypted imprint and a signature, wherein the signature identifies a peer node of the one or more peer nodes associated with the imprint; and
committing the first message to the blockchain.

12. The system of claim 11, the processor being further configured to perform operations comprising:
generating a second message, wherein the second message includes one or more keys to decrypt the encrypted imprint to reform the imprint; and
committing the second message to the blockchain.

13. The system of claim 12, the processor being further configured to perform operations comprising:
verifying the signature of a peer node of the one or more peer nodes associated with the first message;
collecting the one or more keys from the second message; and
decrypting the encrypted imprints of the first message with the one or more keys from the second message.

14. The system of claim 8, the processor being further configured to perform operations comprising:
analyzing the imprint consensus;
identifying the process information associated with the imprint that does not identically match the imprint consensus; and
generating a report, wherein the report includes where the error is located within the process information.

15. A computer program product for a self-auditing blockchain having one or more peer nodes, the computer program product comprising a computer readable storage medium having program instructions embodied therewith, the program instructions executable by a processor to cause the processors to perform a function, the function comprising:
collecting process information associated with each peer node of the one or more peer nodes associated with the self-auditing blockchain;
generating an imprint for each peer node of the one or more peer nodes from the process information using one or more hash functions;
determining an imprint consensus, wherein determining the imprint consensus includes identifying a group of peer nodes, of the one or more peer nodes, having an identical imprint; and
comparing the imprint from each of the one or more peer nodes to the imprint consensus to detect an error, wherein the error indicates that a peer node of the one or more peer nodes has been compromised.

16. The computer program product of claim 15, the function further comprising:
identifying where the error of the compromised peer occurred in the process information using the imprint.

17. The computer program product of claim 15, the function further comprising:
encrypting the imprint to form an encrypted imprint;
generating a first message, wherein the first message includes the encrypted imprint and a signature, wherein the signature identifies a peer node of the one or more peer nodes associated with the imprint; and
committing the first message to the blockchain.

18. The computer program product of claim 17, the function further comprising:
generating a second message, wherein the second message includes one or more keys to decrypt the encrypted imprint to reform the imprint; and
committing the second message to the blockchain.

19. The computer program product of claim 15, the function further comprising:
analyzing the imprint consensus;
identifying the process information associated with the imprint that does not identically match the imprint consensus; and
generating a report, wherein the report includes where the error is located within the process information.

\* \* \* \* \*